United States Patent [19]

Tanner et al.

[11] Patent Number: 5,217,296
[45] Date of Patent: Jun. 8, 1993

[54] SOLAR POWERED LIGHT

[75] Inventors: David P. Tanner; John S. Frost, both of Thousand Oaks; Mark R. Erickson, Oxnard; Fred A. Moore, Newbury Park, all of Calif.

[73] Assignee: Siemens Solar Industries, L.P., Camarillo, Calif.

[21] Appl. No.: 684,527

[22] Filed: Apr. 11, 1991

[51] Int. Cl.⁵ .............................................. F21L 7/00
[52] U.S. Cl. .................................. 362/183; 362/418; 362/802; 362/250
[58] Field of Search ............... 362/183, 184, 250, 812, 362/418, 802, 249; 136/294, 291, 246, 243; 248/276, 284, 288.3

[56] References Cited

U.S. PATENT DOCUMENTS

| | | | |
|---|---|---|---|
| 2,909,171 | 10/1959 | Lof | 126/451 |
| 3,883,804 | 9/1974 | Vesely | 362/302 |
| 4,281,369 | 7/1981 | Batte | 362/183 |
| 4,410,930 | 10/1983 | Yachabach | 362/234 |
| 4,486,820 | 12/1984 | Baba et al. | 362/183 |
| 4,774,648 | 9/1988 | Kakuk et al. | 362/302 |
| 4,835,664 | 5/1989 | Wen | 362/183 |
| 4,841,416 | 6/1989 | Doss | 362/183 |
| 4,977,488 | 12/1990 | Spotts et al. | 362/183 |
| 4,989,124 | 1/1991 | Shappell | 362/183 |
| 5,003,439 | 3/1991 | Yang | 362/183 |

FOREIGN PATENT DOCUMENTS 304787 12/1989 Japan .................................. 136/246

Primary Examiner—James C. Yeung
Attorney, Agent, or Firm—Nilsson, Wurst & Green

[57] ABSTRACT

A solar powered light adapted to be mounted under the eaves of a building, a wall or the like for use in security applications. In a preferred embodiment of the present invention, the solar powered light comprises an adjustable configuration having a lamp with an infrared detector or sensor rotatably mounted thereto and a photovoltaic or solar cell array rotatably disposed at a remote end of an extension arm movably attached to the lamp. Such a flexible arrangement allows the photovoltaic array to be positioned to receive direct sunlight. The sensor activates the solar powered light upon sensing infrared to illuminate the surrounding areas when a presence is sensed and turn it off when a presence is no longer sensed. In accordance with a second embodiment, the solar powered light does not include an infrared detector and provides continuous illumination for a given period of time. In accordance with a third embodiment, the solar powered light does not include an infrared detector, but includes a battery having a higher capacity configured to provide illumination for extended periods of time. In accordance with a fourth embodiment, the solar powered light is configured to be used directly with a user's battery. The solar powered light utilizes a compact fluorescent bulb and circuitry for providing longer lamp life, instantaneous illumination and eliminating flickering during start up.

37 Claims, 10 Drawing Sheets

SOLAR POWERED LIGHT

FIELD OF THE INVENTION

This invention relates generally to lighting devices and more particularly to lighting devices used in a variety of applications. More specifically, the invention relates to a solar powered light.

BACKGROUND OF THE INVENTION

Electrically powered outdoor lighting systems are used to illuminate pathways, yards, parks and other like outdoor areas for security or decorative purposes. Such lights are commonly connected to public utility systems or similar sources of electrical power, and are controlled by preset timing devices to illuminate desired areas at nightfall and automatically turn off at a predetermined time, for example, prior to daybreak.

Many conventional lighting devices require extensive cabling, suitable timing mechanisms and the like, and are relatively expensive to install and maintain. In addition, such lighting devices utilize electric power generated in a conventional manner such as by burning fuel. Burning fuel contributes to contamination of the environment and depletion of existing fuel resources.

More recently, self-contained solar powered illumination devices have utilized photovoltaic devices to charge batteries which, in turn, activate a light source contained therein, in the absence of sunlight, for illumination and/or decorative purposes. Such self-contained devices are desirable because they are relatively inexpensive and require very little maintenance.

Traditionally, such self-contained solar powered illumination devices have a rigid configuration constructed to be anchored in the earth at predetermined locations where illumination is desired. The rigid configuration provides illumination in a fixed spherical area surrounding the solar powered device. Such self-contained solar powered illumination devices are not configured to allow mounting to exterior walls or the roof of a building to provide illumination.

Moreover, the photovoltaic arrays are disposed at the top of prior solar powered illumination devices making it necessary for such an illumination device to be positioned to receive sunlight directly on its top surface during daylight hours.

In addition, prior self-contained devices have limited battery power and thus, typically utilize low wattage bulbs, particularly incandescent bulbs which do not generate sufficient light to provide clear illumination in the areas desired. Incandescent bulbs provide a low level of light and render such self-contained illumination devices particularly impractical for security applications. Alternatively, if sufficient illumination is provided, the battery power is insufficient to maintain the illumination for the time desired.

Thus, although such solar powered illumination devices have been known to serve their purpose, they have not proven to be entirely satisfactory.

SUMMARY OF THE INVENTION

A solar powered light adapted to be mounted under the eaves of a building, a wall or the like for use in convenience or security applications. In a preferred embodiment of the present invention, the solar powered light comprises an adjustable configuration having a lamp with an infrared detector or sensor rotatably mounted thereto and a photovoltaic or solar cell array rotatably disposed at a remote end of an extension arm adjustably attached to the lamp. Such an adjustable and rotatable arrangement allows the photovoltaic array to be positioned and adjusted to receive direct sunlight. The sensor activates upon sensing infrared to illuminate the surrounding areas during the time a presence is sensed and turns it off when a presence is not felt.

In accordance with a second embodiment, the solar powered light does not include an infrared detector to activate the lamp only for the duration of time when a presence is sensed and provides illumination for a given or preset period of time.

In accordance with a third embodiment, the solar powered light does not include an infrared detector, but includes a battery having a higher capacity configured to provide illumination for extended periods of time.

In accordance with a fourth embodiment, the solar powered light is configured to be used directly with a user's battery.

The solar powered light in all the four embodiments discussed above utilizes a compact fluorescent bulb and circuitry for providing longer lamp life, an instantaneous start and eliminate flickering during start up.

These as well as other features of the invention will become apparent from the detailed description which follows, considered together with the appended drawings.

BRIEF DESCRIPTION OF THE DRAWINGS

Some preferred embodiments of the present invention are illustrated in and by the following drawings in which like reference numerals indicate like parts and in which.

DETAILED DESCRIPTION OF THE PREFERRED EMBODIMENT

Figure 1:
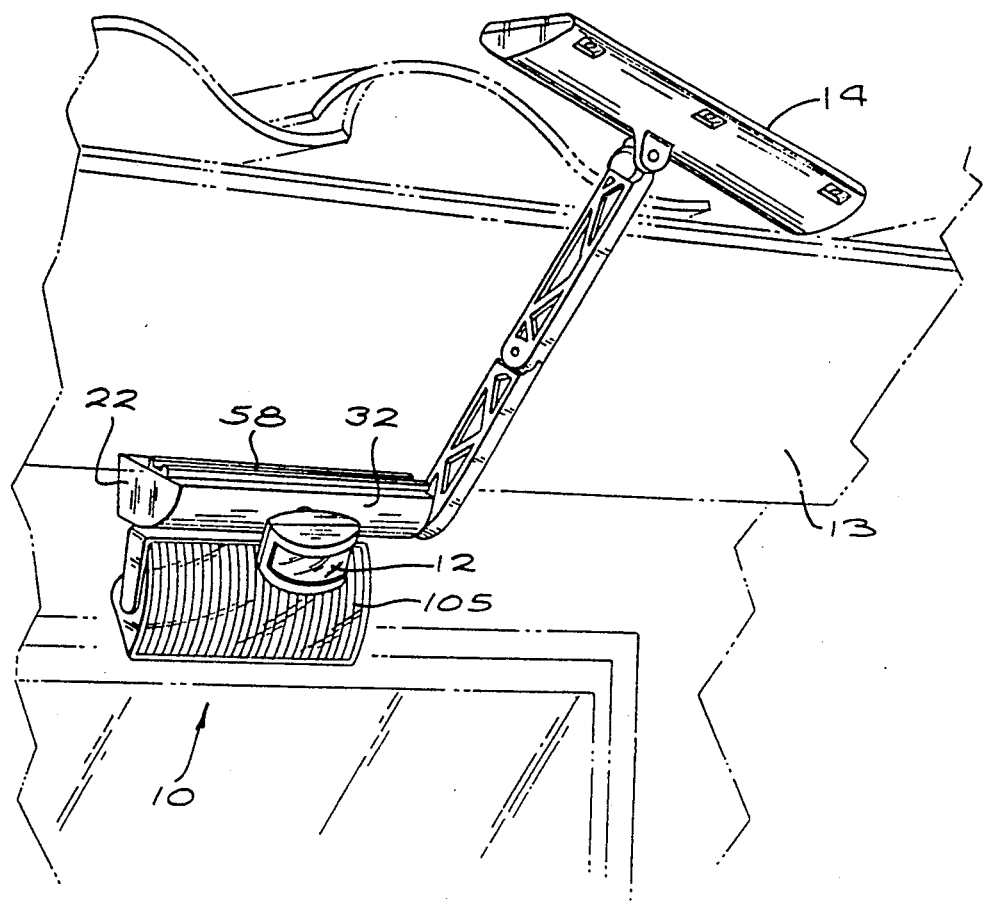
FIG. 1 is a perspective view of a solar powered light, in accordance with a preferred embodiment of the present invention, mounted under the eaves of a building showing an infrared detector or sensor and a photovoltaic or solar cell array disposed at the end of an extension arm and oriented to receive direct sunlight.
Figure 2:
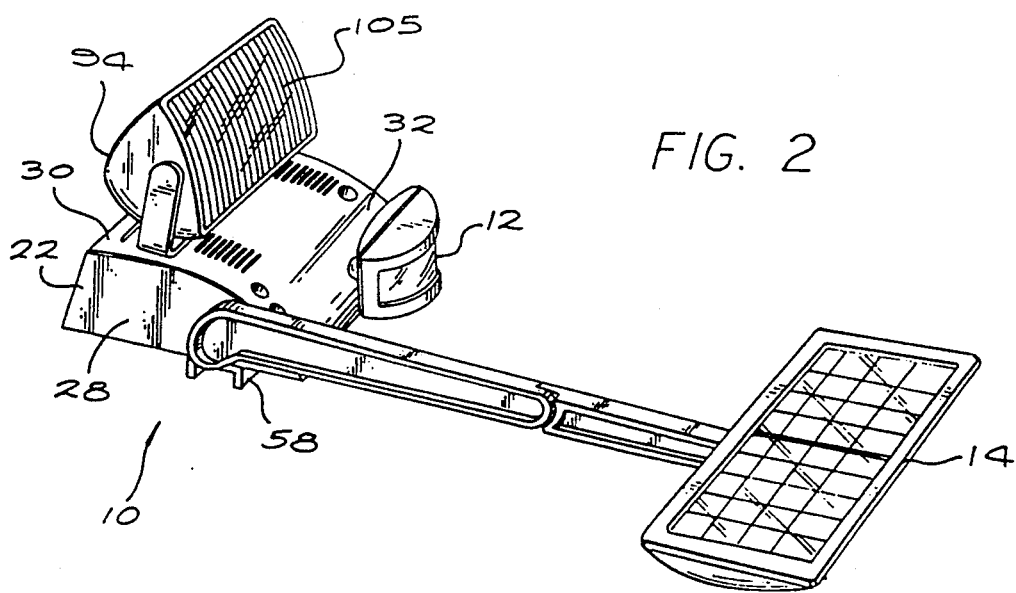
FIG. 2 is another perspective view of the solar powered light of the present invention shown in FIG. 1 with the extension arm in a different rotational position.

FIGS. 1 and 2 illustrate generally a solar powered light 10 of the present invention which may be positioned at desired locations to illuminate desired areas. The embodiments illustrated herein merely exemplify the invention, which may take forms different from the specific embodiments disclosed. The solar powered sensor light 10 in accordance with a preferred feature of the present invention has a detector or sensor 12, preferably a passive infrared sensor which automatically activates the solar powered light 10 upon sensing infrared radiation such as that emitted from human beings. Alternatively, a motion detector may be utilized.

The sensor 12 is particularly advantageous for security applications because it activates the solar powered light 10 only upon sensing infrared. Thus, a building or the like, is suspended in darkness until a person approaching the building is detected. In addition, by activating only upon sensing infrared, the power from the battery 16 is conserved during other times when illumination is not necessary. Thus, the solar powered light 10 in accordance with this embodiment is able to function for a period of two weeks without exposure to direct sunlight. This makes it particularly advantageous for use in areas which receive limited sunlight.

As shown in FIGS. 1 and 2, the solar powered light 10 of the present invention has an adjustable configuration adapted to be easily mounted under the eaves of a building or any wall, indicated generally at 13, to facilitate exposure to direct sunlight for at least some portion of the day.

The solar powered light 10 includes a battery 16 or any such self-contained electrical storage device, preferably a lead acid battery of conventional design, which is maintained in a charged condition by a photovoltaic or solar cell array 14 and includes a power supply electrical circuit 18 (shown in FIG. 12) which controls the flow of current to a compact fluorescent bulb 20 (shown in FIGS. 5 and 5a) contained therein. The electrical power from the battery 16 is supplied to the compact fluorescent bulb 20 when the solar cell array 14 is not producing electricity, that is, when the ambient light falls below a predetermined level and there is insufficient sunlight.

Figure 3:
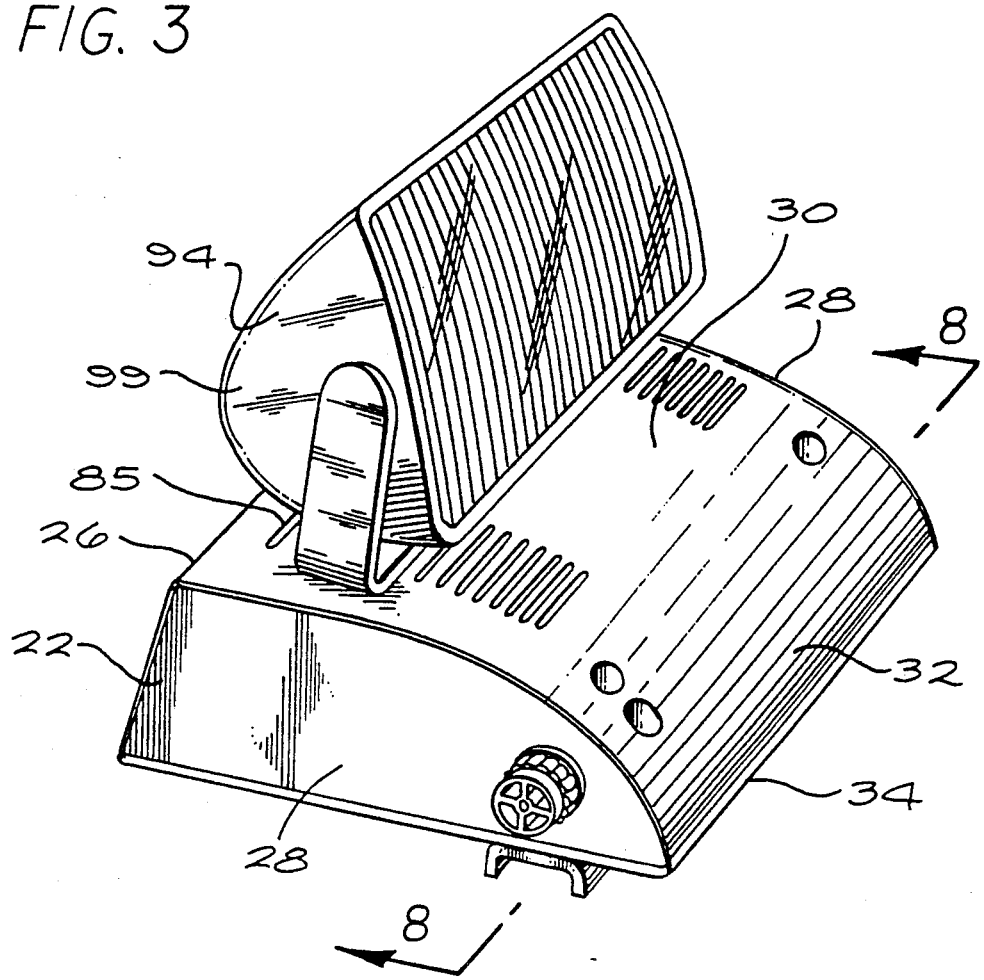
FIG. 3 is a perspective view of a lamp of the solar powered light constructed in accordance with another embodiment of the present invention.
Figure 4:
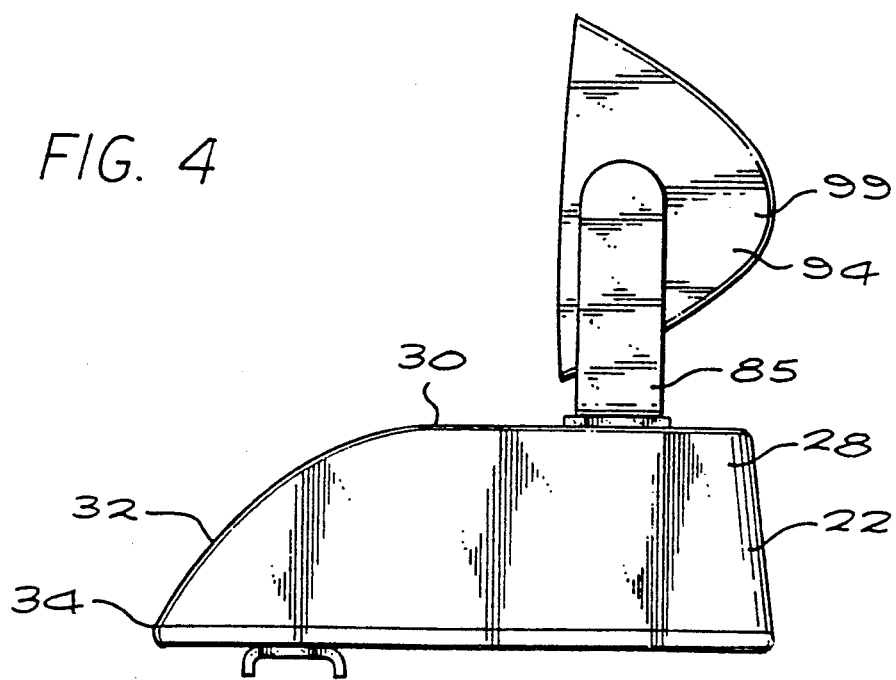
FIG. 4 is a side elevational view of the lamp shown in FIG. 3.
Figure 5:
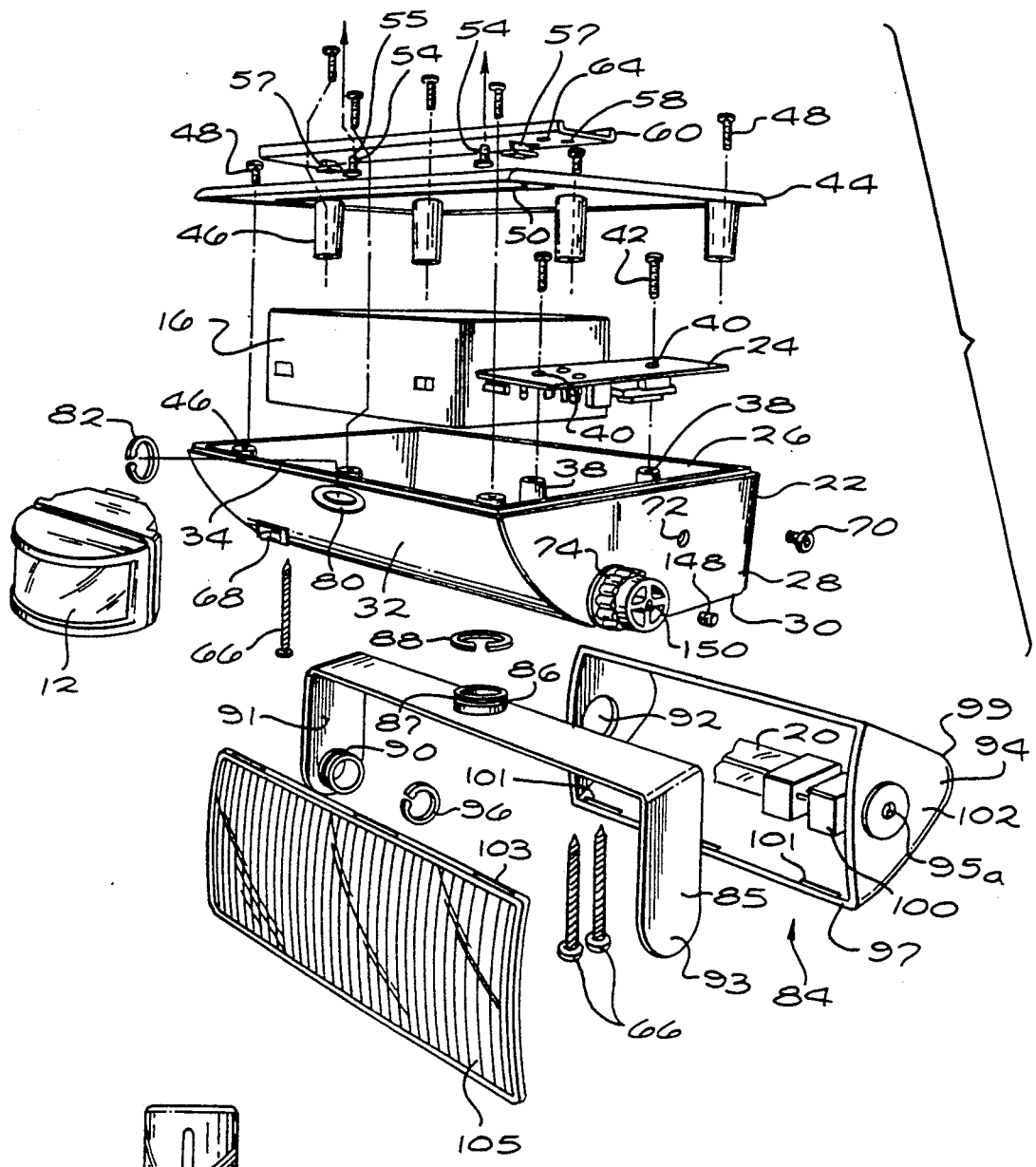
FIG. 5 is an exploded view of the lamp and the infrared detector in accordance with a preferred embodiment of the present invention shown in FIGS. 1 and 2.

Referring to FIGS. 3, 4 and 5, the solar powered light 10 comprises a component tray 22. The component tray 22 is provided to house the battery 16 (shown in FIGS. 5, 6 and 12) and the power supply electrical circuit 18 (shown in FIG. 12) contained on a printed circuit board assembly, indicated at 24 (shown only in FIG. 5). The component tray 22 has vertically oriented rear and side walls 26 and 28, respectively, and a bottom wall 30 (shown in FIGS. 2, 3 and 4 facing up) and front wall 32 contiguously formed and gradually tapered toward its outer peripheral extremity 34.

As shown in FIG. 5, the component tray 22 serves as a housing for the battery 16. Attached to the battery 16 disposed within the component tray 22 are appropriate contacts (not shown) to receive electrical wires to be connected to the circuit board assembly 24 which contains the appropriate electrical circuit 18 to control the application of power to the battery 16 for charging or from the battery 16 to the compact fluorescent bulb 20 to illuminate the same. The circuit board assembly 24 also contains other circuitry described below.

The printed circuit assembly board 24 is retained within the component tray 22. The bottom wall 30 has lugs 38 extending therefrom which are aligned with apertures 40 in the circuit assembly board 24 to receive screws 42. A component tray cover 44 is suitably secured to the component tray 22. The component tray cover 44 has a plurality of lugs 46, preferably eight, disposed around the perimeter of the component tray cover 44, aligned with respective lugs 50 (shown only along the front periphery of the component tray cover 44) formed in the bottom wall 30 to receive self-tapping screws 48. Some of the lugs 46 formed along the front perimeter, preferably four of the plurality of lugs 46, are shorter than the remaining lugs 46. The component tray cover 44 may, of course, be secured to the component tray 22 in other alternative ways known to those skilled in the art.

A mounting flange 58 is suitably secured to the component tray cover 44. The mounting flange 58 is suitably sized to bear the weight of the solar powered sensor light 10 and facilitate mounting to a wall or the like. The mounting flange 58 has a generally flat, rectangular configuration terminating in two legs 60 extending perpendicularly therefrom. A plurality of apertures 64, preferably three, formed in the mounting flange 58 coincide with corresponding apertures formed in the component tray 22 (not shown) to receive long screws 66 which are also received into a wall or under the eaves to suitably secure the solar powered light 10 thereto. Screws 54 received through apertures 55 in the mounting flange 58 secure the mounting flange 58 to a wall. The solar powered light 10 is then held onto the mounting flange 58 and pushed to one side. Clips 57 slide into position holding the solar powered light 10 temporarily in position while the screws 66 are inserted and fastened.

A switch 68 of conventional design, such as a rocker switch, is disposed on the front wall 32 of the component tray 22. The switch 68, when manually placed in an "AUTO" position, activates the solar powered light 10 so that it automatically illuminates upon sensing infrared. When the switch 68 is placed in a "STANDBY" position, the solar powered light 10 is configured so that the solar powered light 10 does not turn on even when it senses infrared. When in the "STANDBY" position, the photovoltaic array 14 advantageously continues to charge the battery 16.

A conventional power jack 70 positioned through an aperture 72 in the side wall 28 connects a cable 77 (shown in FIG. 9) to the photovoltaic or solar cell array 14. Also located on the side wall 28 is a coupling knuckle or joint member 74 which facilitates assembly of an extension arm 76 (shown in FIG. 10). The joint member 74 permits the extension arm 76 to be adjustably positioned.

Figure 9:
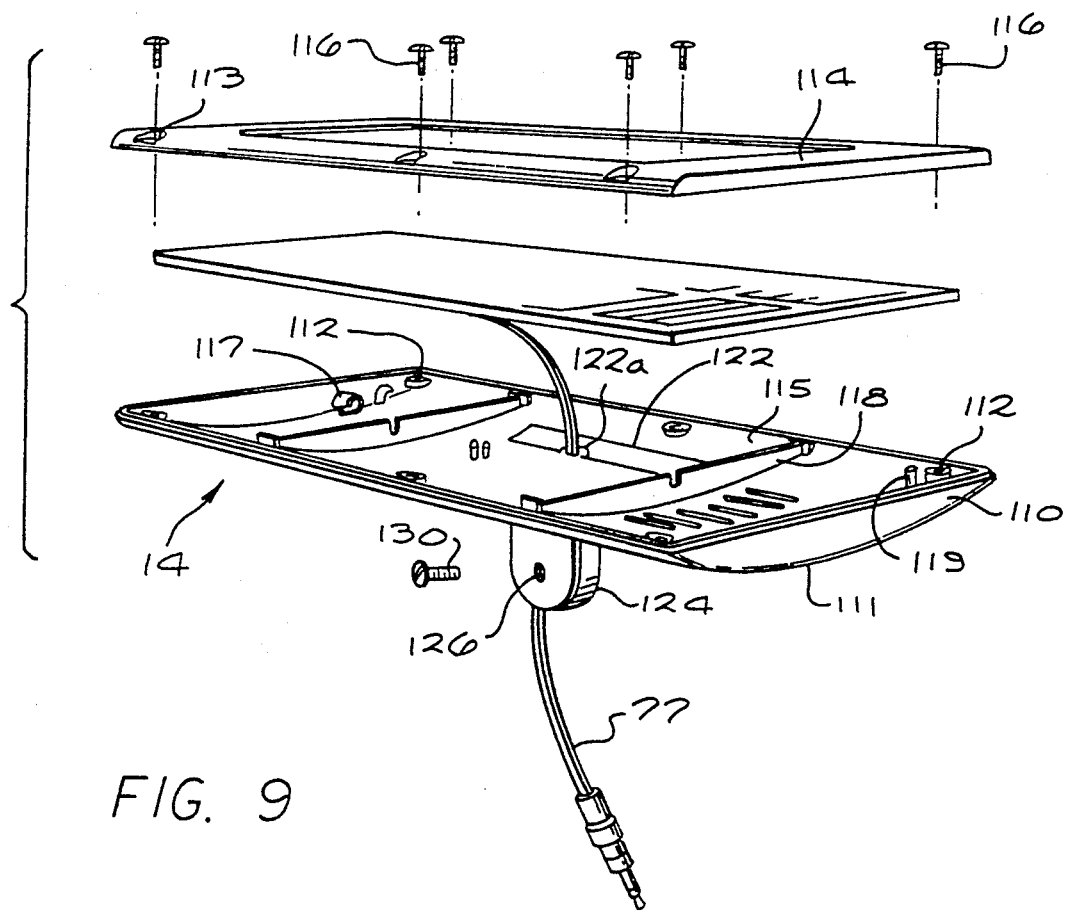
FIG. 9 is an exploded view of the photovoltaic array of the solar powered light of the present invention shown in FIG. 1.
Figure 9A:
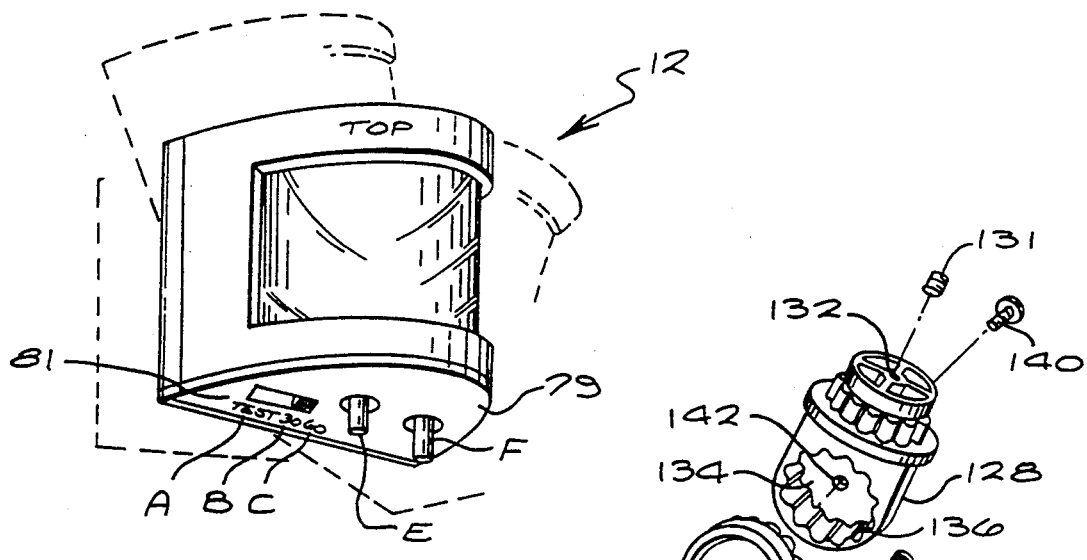
FIG. 9a is an isometric view of the infrared detector of the solar powered light shown in FIGS. 1 and 2.

Referring now to FIG. 9a, the infrared detector or passive infrared detector 12, has a housing 79 with a ball joint (not shown) received within a receptacle 80 (shown only in FIG. 5) formed in the front wall 32 of the component tray 22 and held in place by a retaining ring 82 (shown only in FIG. 5). The ball joint and the receptacle 80 combine to mount the passive infrared detector 12 so that it can be rotated 30° in any direction (shown in broken lines in FIG. 9a). As shown in FIG. 9a, the detector housing 79 has a three position slide switch 81, of conventional design, which is movable between a "Test" position, indicated at A, a "30 second" position, indicated at B, and a "60 second" position, indicated at C. The housing 79 also comprises a sensitivity control, indicated at F, and a darkness control, indicated at E. By turning the switch 81 to its "Test" position, the solar powered light 10 is activated during the daylight hours. This allows a user to adjust the direction of the detector 14 to face the area in which detection of infrared is desired. In addition, when the switch 81 is in the "Test" position, the sensitivity may be set to prevent pets or other small animals from activating the solar powered light 10. The darkness control E may likewise be adjusted to turn on the solar power light 10 at a given time during dusk. The "30 second" position or the "60 second" position indicate the time period that the light will remain on after the infrared is no longer detected.

Referring again to FIG. 5, a light assembly 84 is secured to the bottom wall 30 of the component tray 22. The light assembly 84 comprises a reflector bracket 85 having an annular connector 86 extending therefrom. The annular connector 86 is received within a corresponding aperture (not shown) provided in the bottom wall 30 of the component tray 22. A groove 87 formed about the periphery of the annular connector 86 receives a retaining ring 88 to hold the reflector bracket 85 in place on the component tray 22. The reflector bracket 85 likewise has an annular connector 90 extending inward from an end 91 of the reflector bracket 85 and received within an opening 92 formed within a reflector assembly 94 via a retaining ring 96. Another end 93 of the reflector bracket 85 is affixed to the reflector assembly 94 by a pin (not shown) received through an aperture 95a. The reflector assembly 94 can be rotated 180° in a vertical or horizontal direction to focus the light at any desired location.

Figure 5A:
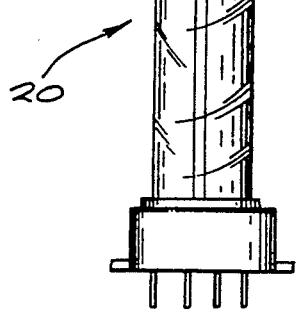
FIG. 5a is a front elevational view of a compact fluorescent bulb used in the lamp of FIG. 5.

The reflector assembly 94 has a conical configuration with an open face 97 and a tapered rear portion 99 surrounding the compact fluorescent bulb 20, which is plugged into a socket 100 located on a side wall 102 of the reflector assembly 94. The curved inner surface of the reflector assembly 94 advantageously focuses the light provided by the compact florescent bulb 20 which is a linear light source. The florescent bulb 20 shown in FIG. 5a is preferably an OSRAM DULUX bulb. The reflector assembly 94 has recesses 101 disposed about its peripheral extremity which receive projections 103 formed about the peripheral edge of a prismatic lens 105. The projections 103 snap easily into the recesses 101, securely retaining the lens 105 at the open face 97 of the reflector assembly 94.

Figure 6:
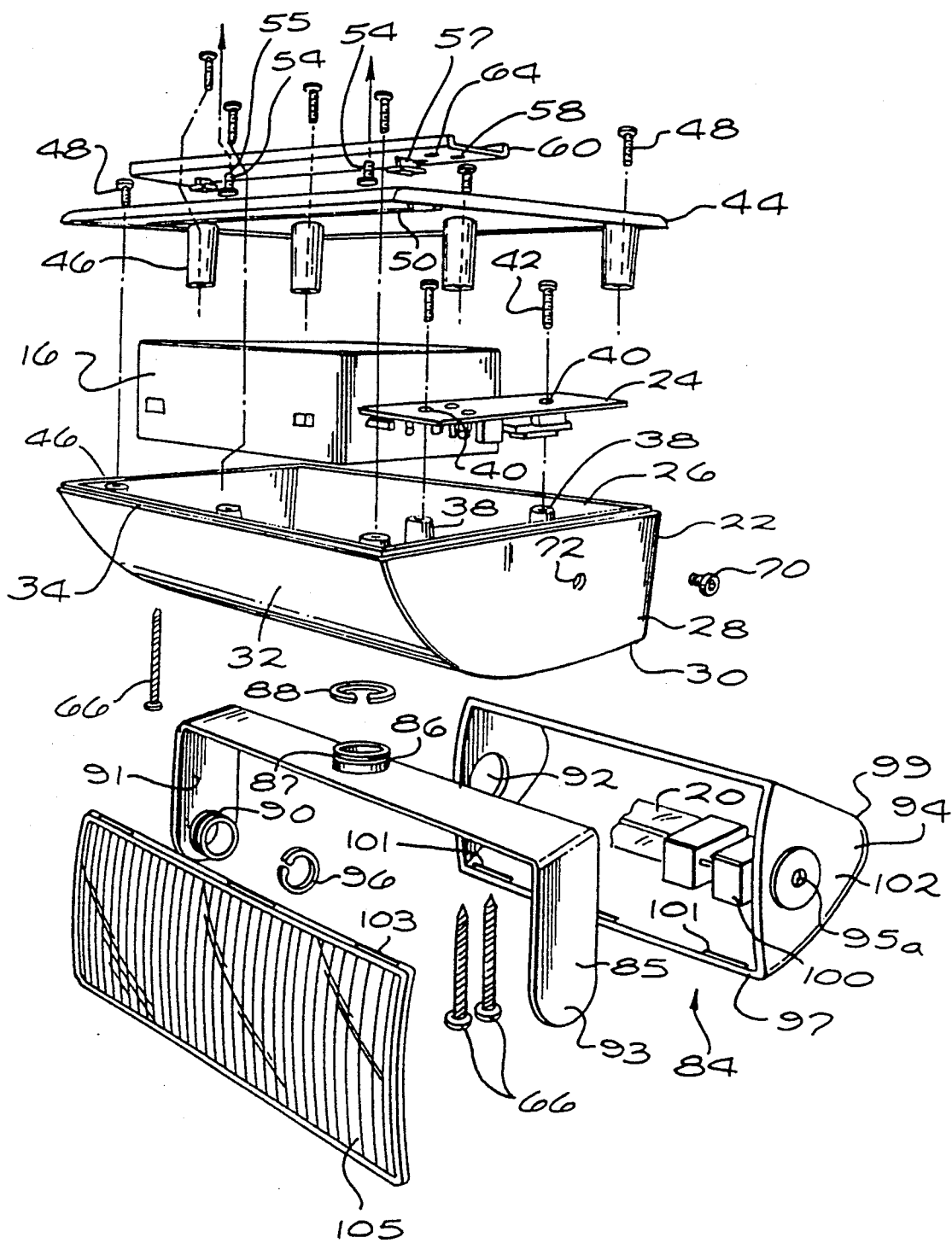
FIG. 6 is an exploded view of the lamp of the solar powered light shown in FIG. 3, without an infrared detector in accordance with a second embodiment of the present invention; in accordance with a third embodiment of the present invention, the lamp shown in FIG. 3 is configured with a battery adapted to provide illumination for extended periods of time.

Referring now to FIG. 6, in accordance with a second embodiment, the solar powered light 10 is configured without the detector 12 and provides continuous illumination, if desired, for extended periods of time. In accordance with a third embodiment, the solar powered light 10 is configured to provide illumination for even longer periods of time, for example four hours. The battery 16 in this embodiment is a lead acid battery having a capacity of 10 ampere-hours.

Figure 7:
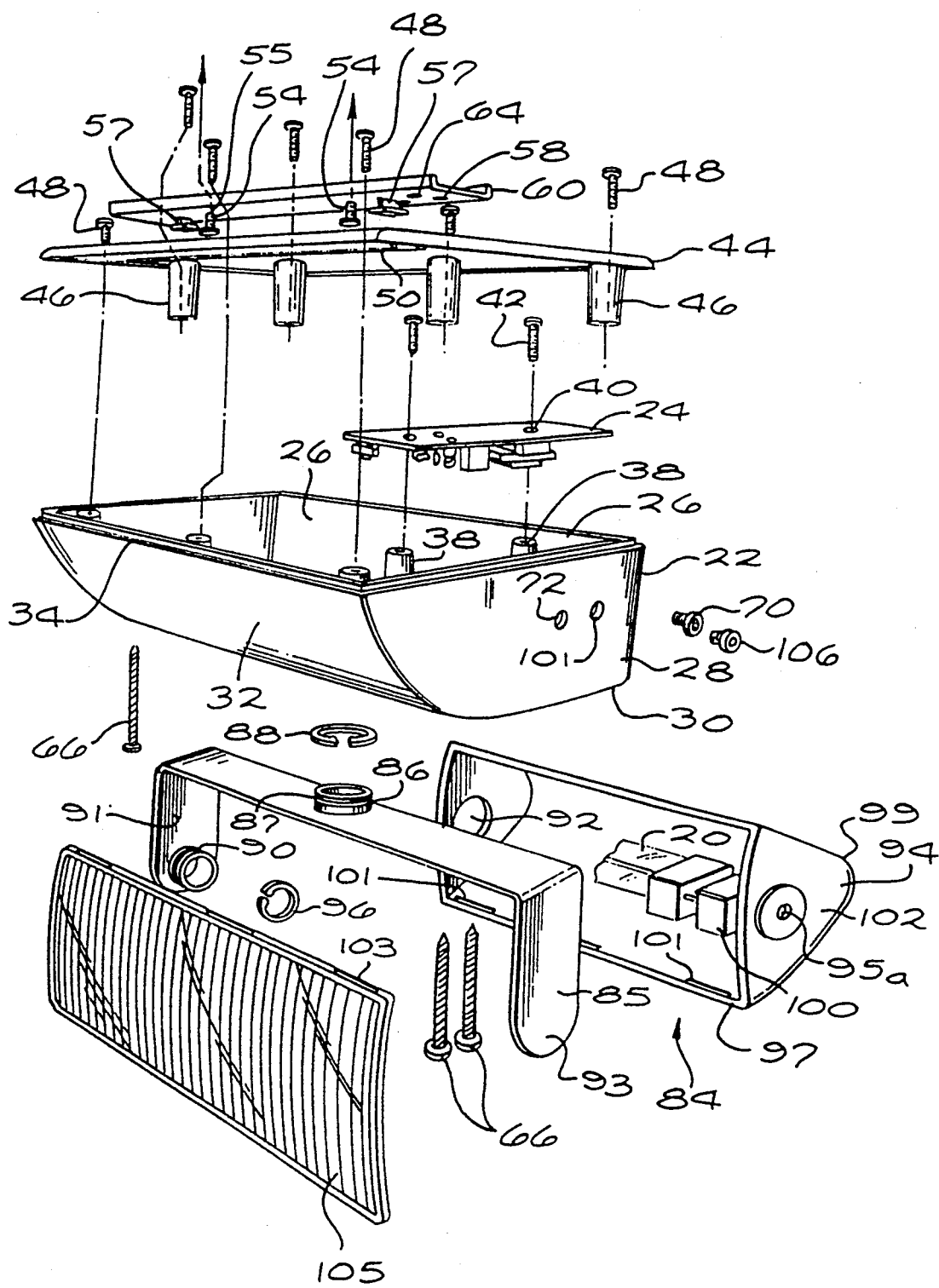
FIG. 7 is an exploded view of the lamp in accordance with a fourth embodiment configured to connect directly to a user's battery.

Referring now to FIG. 7, in accordance with a fourth embodiment, the solar powered light 10 is configured to connect directly to a user's battery source (not shown). A power jack 106 positioned within an aperture in the side wall 28 facilitates a cable hook up directly to a user's battery in a manner known to those skilled in the art.

Referring now to FIG. 9, the solar cell array 14 is housed within a photovoltaic housing 110. The photovoltaic housing 110 has a generally rectangular configuration with a gently curved outer surface 111. A plurality of lugs 112 located about the periphery of the photovoltaic housing 110 and extending therefrom are aligned with corresponding apertures 113 formed in a flange 114 nd receive self-tapping screws 116 (inserted from the top or bottom) therethrough. An inner surface 115 of the photovoltaic housing 110 also comprises positioning members 118 located at spaced locations to support a photovoltaic panel 120 securely within the housing 110 and pins 119 to keep it in position. The cable 77 is received through a removable door 122 formed in the photovoltaic housing 110 and connects to the photovoltaic panel 120. The door 122 is configured to receive excess cable and has an opening 122a through which the cable 77 is received. A semi-circular mounting portion 124 projects from the outer surface 111 of the photovoltaic housing 110 and defines a centrally located aperture 126. Clips 117 disposed at each end of the photovoltaic housing 110 hold the excess cable in place and act as a strain relief.

Figure 10:
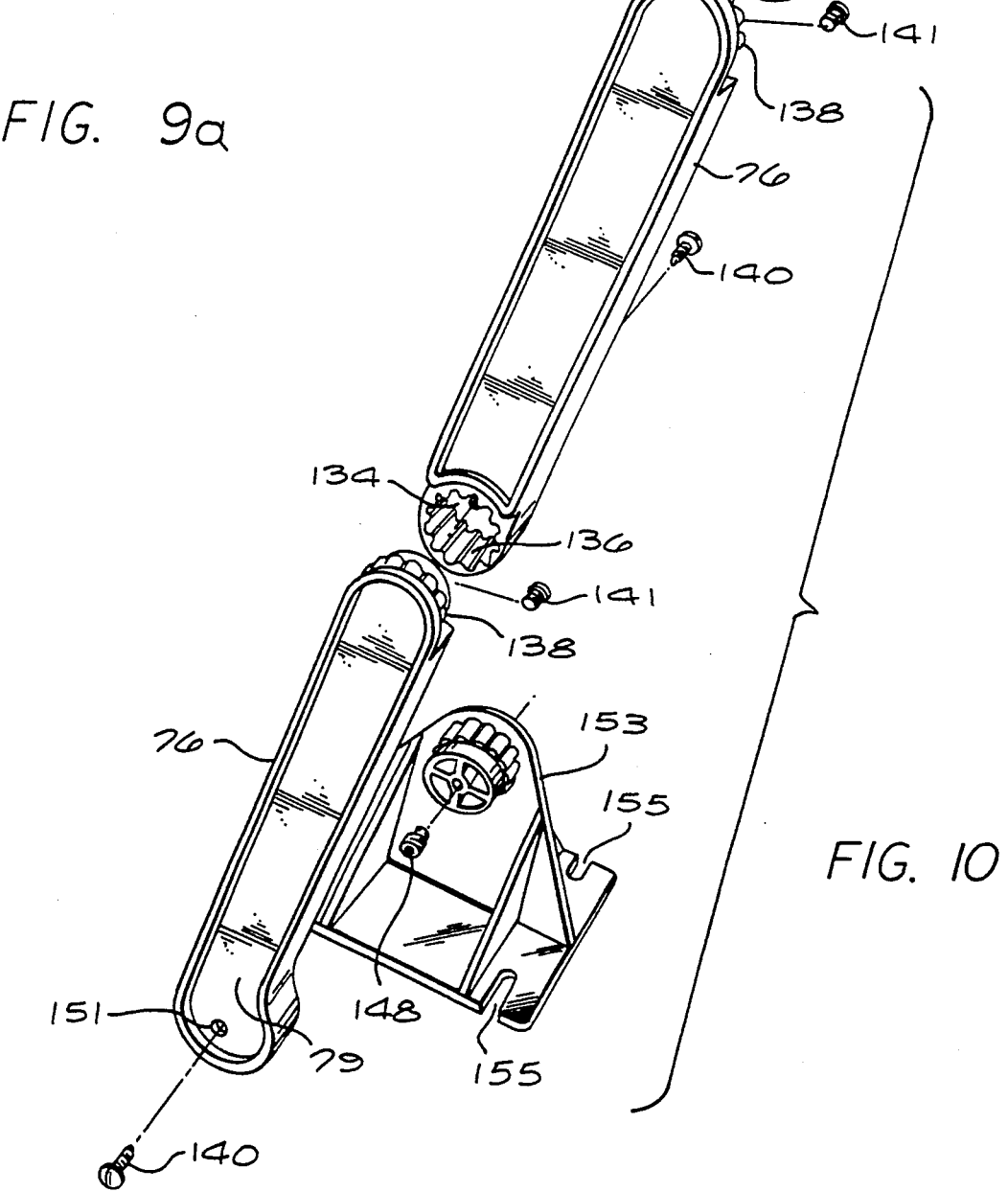
FIG. 10 is an exploded view of an extension arm of the solar powered light of the present invention.

Referring now to FIG. 10, the extension arm 76 is secured to the photovoltaic housing 110 by a joint member 128, known to those skilled in the art. The joint member 128 is adjustably attached to the projection portion 124 by a screw 130 and a retaining insert 131 which is received through an opening 132 in the joint member 128 aligned with the aperture 126 in the projection portion 124. The joint member 128 has an opening 134 having a plurality of corrugations or gripping members 136 extending inwardly therefrom. The gripping members 136 of the joint member 128 mate with alternately disposed gripping members 138 on the extension 76 in an interlocking arrangement. The joint member 128 is adjustably secured to the extension 76 via a screw 140 and a retaining insert 141 which are received through an aperture 142 in the joint member aligned with a corresponding aperture (not shown) formed in the extension arm 76. The angle at which the extension arm 76 is positioned is adjusted by removing the screw 140 and rotating the extension arm 76 to a new position. In this manner, a plurality of extensions 76 are assembled to extend the solar cell array to an area exposed to direct sunlight.

An opposite end 79 of the extension arm 76 is secured to the joint member 74 (shown in FIG. 5) by a screw 140 and a retaining insert 148 which is received through an aperture 150 (shown in FIG. 5) formed in the joint member 74 aligned with an aperture 151 in the extension arm 76. Alternatively, the opposite end 79 may be secured to a roof mounting bracket 153 to facilitate remote positioning of the solar cell array 14 (shown in FIG. 11e). The mounting bracket 153 is suitably mounted to a roof by screws received through slots 155.

Figure 8:
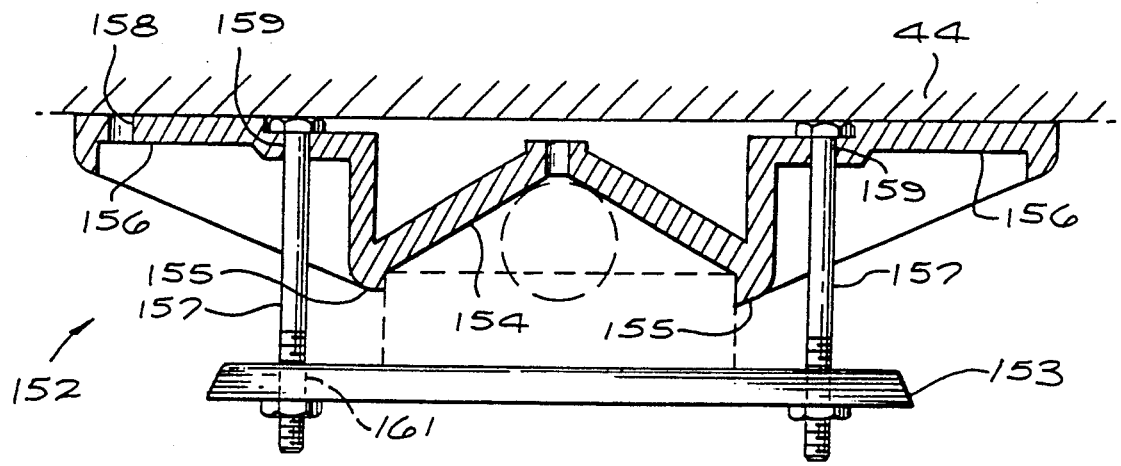
FIG. 8 is a cross sectional view taken along line 8—8 of FIG. 3 showing an alternative mounting means adapted to mount the solar powered sensor light to a pole for use in open areas, replacing the mounting flange shown in FIG. 3.

Referring now to FIG. 8, a mounting bracket 152 which replaces the mounting flange 58 (shown in FIG. 7) allows the solar powered light 10 to be mounted on round or square poles to illuminate areas in desired areas such as parks or the like. The mounting bracket 152 has a v-shaped configuration providing a groove 154 to accommodate a round pole (indicated in broken lines) of suitable size. Alternatively, a square pole (also shown in broken lines) may be accommodated and retained by retaining ears 155 formed at the ends of the v-shaped configuration and extending inward. The v-shaped configuration terminates in projecting members 156 extending in a perpendicular direction away from the v-shaped configuration. The projecting members 156 have apertures 158 formed therein which are aligned with apertures (not shown) formed in the component tray cover 44 to receive screws therethrough, thereby securing the mounting bracket 152 against the component tray cover 44. A retaining bracket 153 disposed opposite the mounting bracket 152 with the pole held securely therebetween is fastened by bolts 157 extending through openings 159 formed in the projecting members 156 on either side of the v-shaped configuration and aligned with corresponding openings 161 formed in the retaining bracket 153.

Figure 11A:
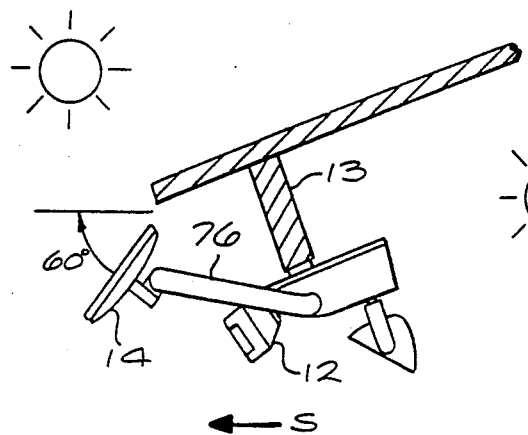
FIGS. 11 a, b, c, d, and e are schematic representations of the solar powered light of the present invention mounted in different positions to receive direct sunlight.
Figure 11B:
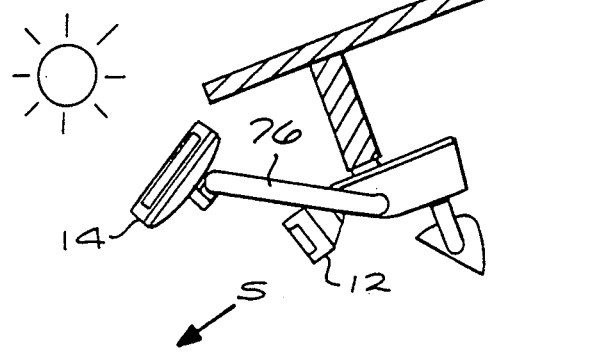
Figure 11C:
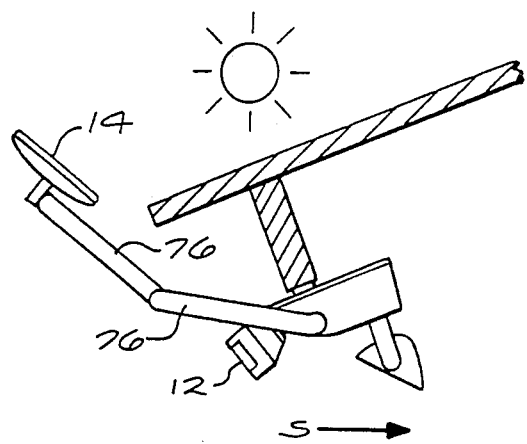
Figure 11D:
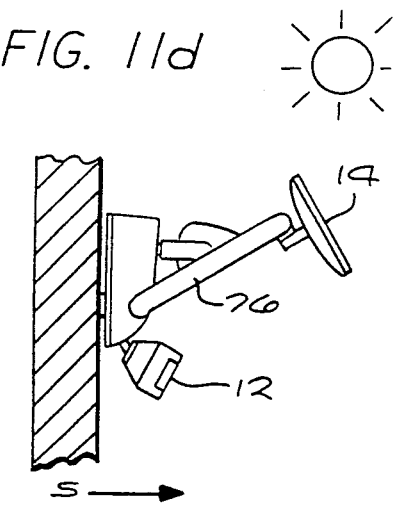
Figure 11E:
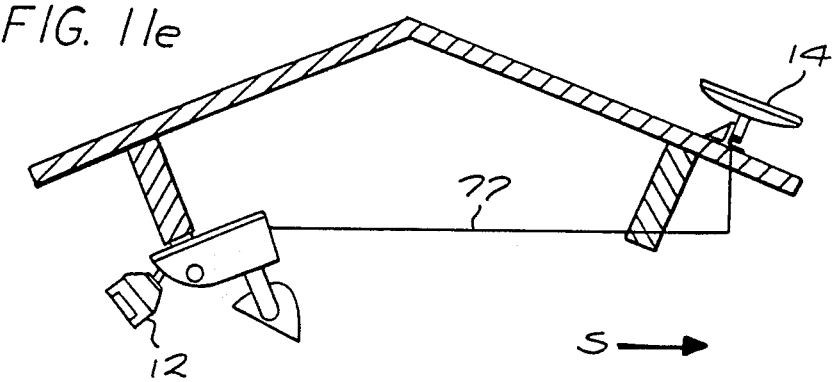

Referring now to FIG. 11a, the solar powered light 10 is preferably mounted onto any suitable surface, such as a surface of solid wood or the like, in a location where it receives direct sunlight. For best results, the solar powered sensor light 10 is mounted facing south in the northern hemisphere, at an angle of about 60° toward the sun. The solar powered light 10 is mounted under the eave, indicated at 13, utilizing a single arm extension 76 to reach direct sunlight. Referring now to FIG. 11b, the solar powered light 10 is mounted under the eave 13 utilizing a single arm extension 76 with the photovoltaic array 14 in a direction facing the sun. Referring to FIG. 11c, the solar powered light 10 is mounted under the eave 13 utilizing two extensions 76 to reach direct sunlight. Referring to FIG. 11d, the solar powered light is mounted to a wall. Referring to FIG. 11e, the lamp is mounted under the eave 13 with the photovoltaic array 14 mounted to the roof at a location remote from the lamp.

Figure 12:
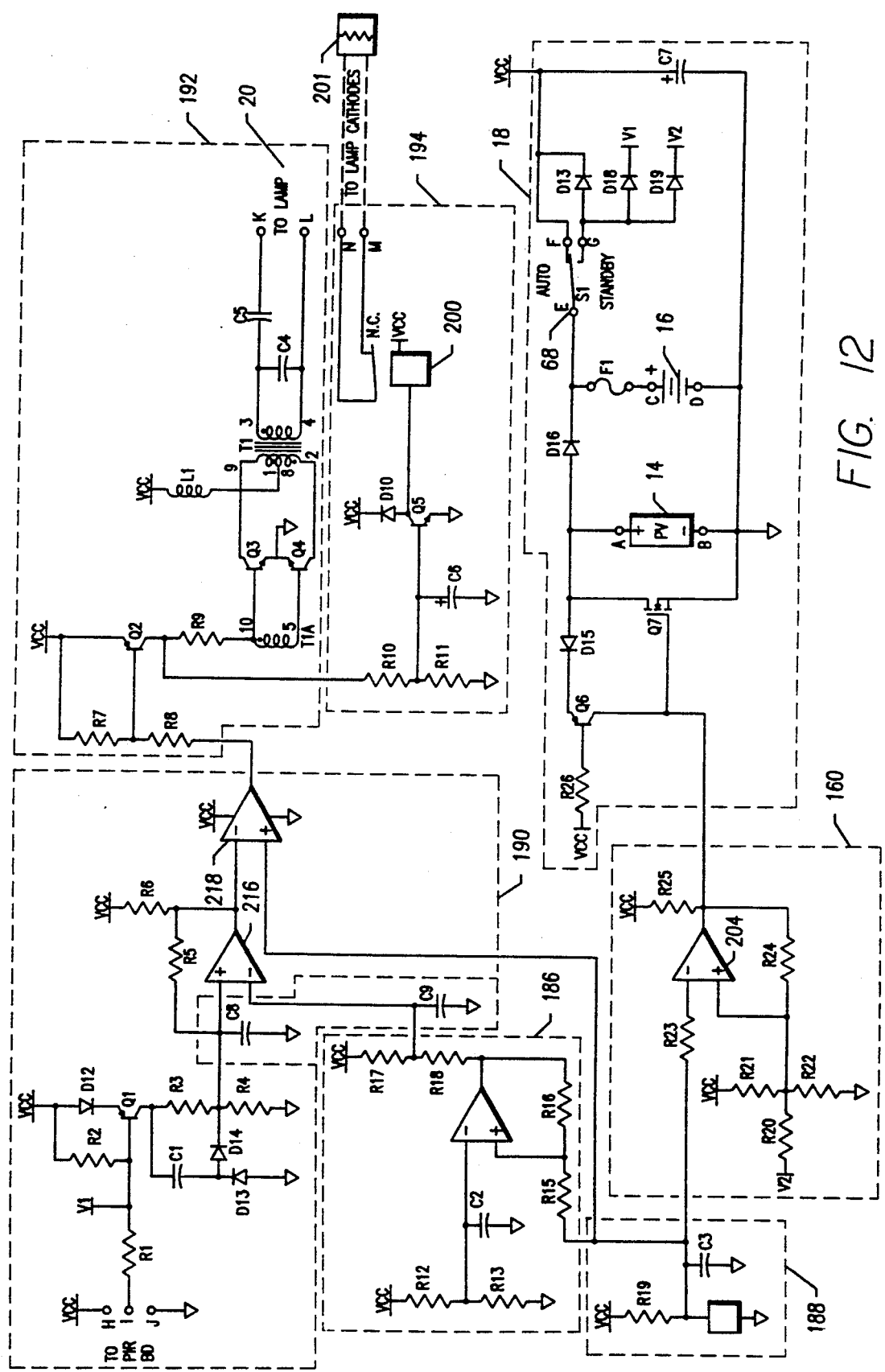
FIG. 12 is a schematic diagram of the power supply electrical circuitry and related circuitry in the solar powered light of the present invention.

Referring now to FIG. 12, the power supply electrical circuit 18 and other circuitry are disclosed in greater detail. The circuitry of the solar powered light 10 advantageously provides longer lamp life and facilitates instantaneous lighting of the compact fluorescent bulb 20 without substantial flickering. The solar powered light in accordance with a preferred embodiment utilizes a lead acid battery, known to those skilled in the art having a capacity of 6.5 ampere-hours. As described previously, the battery 16 is maintained in a charged condition by the photovoltaic array 14 and the power supply electrical circuit 18 (shown in FIG. 12) controls the flow of current to the compact fluorescent bulb 20 and all the other circuitry in the solar powered light 10. The flow of current from the photovoltaic array 14 to the battery 16 occurs when the solar cell array 14 is producing electricity, that is, when the ambient light goes above a predetermined level, in a manner known to those skilled in the art. An overcharge protection circuit, indicated at 160, isolates the photovoltaic array cell at 7.3 volts and does not permit flow of current between the two until the level of voltage in the battery 16 drops to 6.9 volts, after which flow of current resumes.

Figure 13:
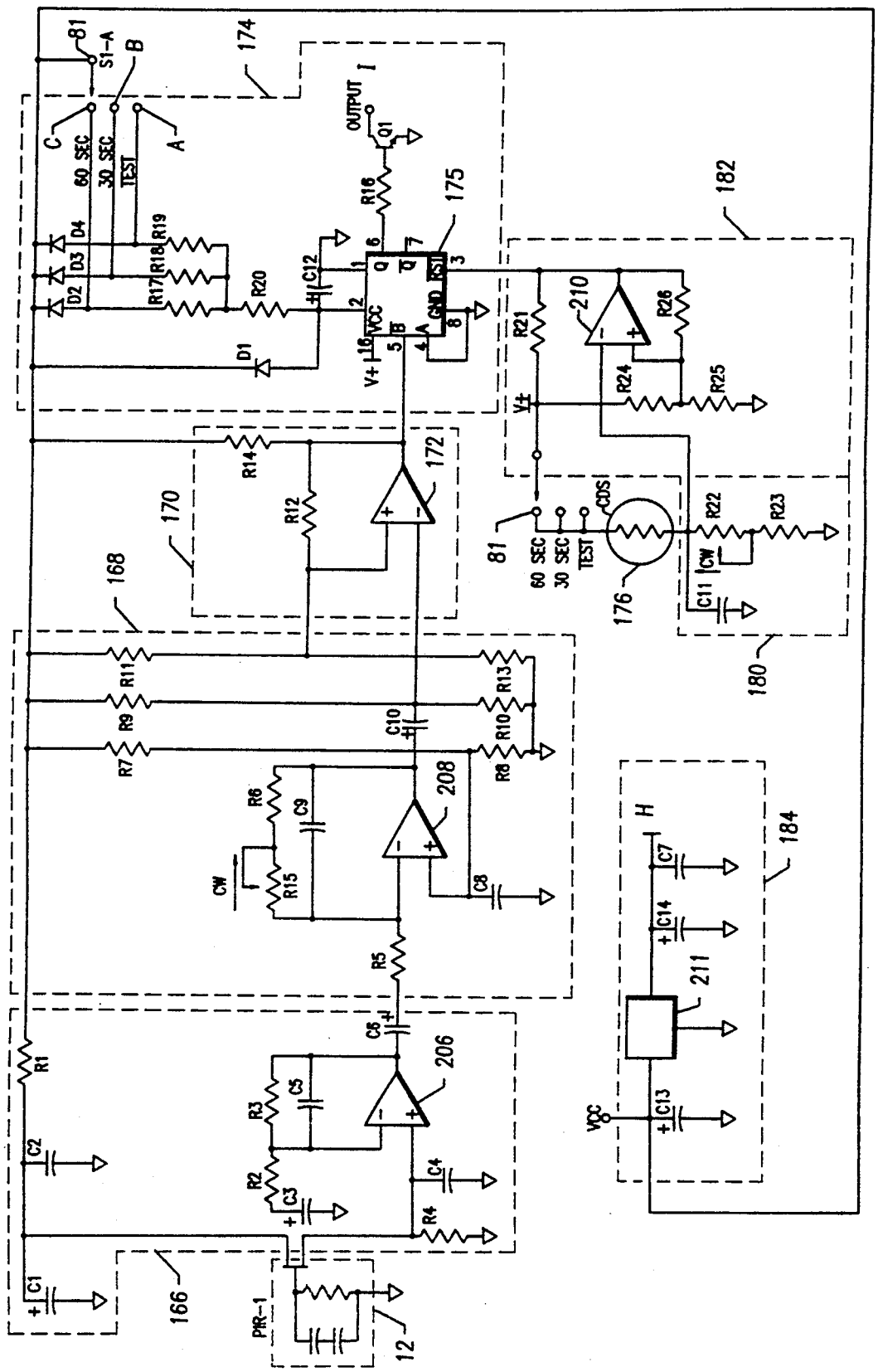
FIG. 13 is a schematic diagram of the passive infrared sensor and related circuitry in the solar powered light of the present invention.

Referring now to FIG. 13, when the passive infrared detector 12 senses infrared radiation, a bipolar signal (positive and negative) is generated. Each of two amplifier stages connected in series, a first amplifier stage, indicated at 166, and a second amplifier stage, indicated at 168, amplifies the negative portions of the wave sensed by fifty-six times to increase the sensitivity of the passive infrared detector 12. A variable resistor R15 (the sensitivity control F) in the second amplifier stage 168 can be adjusted to vary the gain to avoid activating the solar powered light 10 unnecessarily, upon detecting pets or other small animals.

The output of the second amplifier stage 168 is connected to a comparator circuit, indicated at 170. The comparator circuit 170 has a comparator 172 and the output of the second amplifier stage 168 is connected to the inverting input of the comparator 172. The noninverting input of the preselected comparator circuit 170 is biased to a preselected comparison voltage. When the output of the second amplifier stage 168 produces a voltage greater than the comparison voltage at the noninverting input of the comparator 172, the output of the comparator 172 and the output of the comparator circuit 170 are at a low voltage.

The output of the comparator circuit 170 is connected to an active low enable input of a timer circuit 174. Thus, the timer circuit 174 is activated when the passive infrared detector 12 senses infrared so that it can in turn activate the lamp 20.

The switch 81 is configured to couple different resistance values to a capacitor C12 of the timer circuit 174. The resistance values are chosen to keep the lamp 20 lit for the preselected time intervals after the passive infrared detector 12 no longer detects sufficient infrared radiation. In the "Test" position, the switch 81 selects a small resistance so that the lamp 20 remains lit only a short time.

A Cadmium-Sulfide (CdS) sensor 176, known to those skilled in the art, generates a resistance in the presence of light. The sensor 176 is connected to the supply voltage when the switch 81 is in the 30 second or 60 second position, and is disconnected when the switch 81 is in the "Test" position. A sensor adjust circuit 180 has a variable resistor R22 to adjust the sensitivity of the sensor 176. This enables the solar powered light 10 to operate in the presence of a street light or other extraneous light source.

The sensor adjust circuit 180 is connected to a second comparator circuit 182 which is similar to the comparator circuit 170. The second comparator circuit 182 is connected to an active low reset input of the timer circuit 174 which resets the timer circuit 174 when the sensor 176 detects light. The output of the timer circuit 174 connects to a point I (shown in FIG. 12). A constant voltage regulator 184 regulates the supply voltage to avoid fluctuations.

Referring again to FIG. 12, a voltage detection circuit 186 which is a comparator circuit compares the supply voltage produced by the battery 16 with a reference voltage generated by a reference voltage circuit 188. The voltage detection circuit 186 is configured to disable a lamp activation circuit 190 when the voltage produced by the battery 16 drops below 5.70 volts. The voltage detection circuit 186 enables the lamp activation circuit 190 when the voltage produced by the battery 16 rises above 6.25 volts. The voltage detection circuit 186 thereby keeps the open circuit "leak-up" of the battery 16 from automatically reactivating the lamp after it ha been deactivated for low battery voltage. Thus, the voltage detection circuit 186 allows the battery 16 to power the solar powered light 10 only until the battery 16 has been discharged by 70%.

The reference voltage circuit 188 produces a constant voltage of 1.235 volts, regardless of the voltage produced by the battery 16.

The lamp activation circuit 190 provides current to an AC generation circuit 192 when the timer circuit 174 is activated, and the switch 68 is in the "AUTO" position. Upon these conditions, the output of the lamp activation circuit 190 is low. Capacitors C8 and C9 serve to eliminate noise.

When the output of the lamp activation circuit 190 is low, an AC generation circuit 192 is caused to supply the lamp 20 with alternating current sufficient to cause the lamp 20 to emit light. Capacitors C4 and C5 connected to a secondary winding 197 of a transformer T1 limit the current through the cathodes. Resistors R10 and R11 and capacitor C6 supply AC current to the lamp cathodes for a short time period sufficient to allow the cathodes to be heated by a lamp cathode heater circuit 194. By starting the lamp 20 after the cathodes have heated up, the lamp 20 advantageously lasts for approximately 30,000 starts. If the AC current were supplied to the lamp cathodes before the cathodes had heated up sufficiently, the lamp 20 would only last for approximately 1500 starts.

An output of the AC generation circuit 192 turns on the lamp cathode heater circuit 194. This circuit provides current to the filaments of the cathodes of the lamp 20 to heat the cathodes sufficiently to emit electrons. The lamp cathode heater circuit 194 comprises a relay 200 which allows the AC current to flow through the lamp cathodes.

In an alternative embodiment, the relay 200 and the lamp cathode heater circuit 194 is replaced with a thermistor 201 (shown in broken lines) which is heat coupled to the cathode filaments. The thermistor provides a large resistance when the cathode filaments are hot and provides a low resistance when the cathode filaments are cold. In this manner, the thermistor conserves power by only providing current to the lamp cathodes when they are cold and require heating.

The electrical circuit 18 shown in FIG. 12 comprises three diodes, D17 connected to the supply voltage has an exemplary part number of 1N4001, D18 connected to the lamp activation circuit 190 has an exemplary part number of 1N4148, D19 connected to the overcharge protection circuit 160 has an exemplary part number of 1N4148. A 5-ampere fuse F1 is connected between the switch 68 and the battery 16. A transistor Q7 has an exemplary part number of MTP3055E, and a transistor Q6 has an exemplary part number of 2N2907. Diodes D15 and D16 have exemplary part numbers of 1N4148 and 1N5817, respectively. A resistor R26 has an exemplary value of 100 kΩ and a capacitor C7 has an exemplary capacitance of 100 μF.

The overcharge protection circuit 160 shown in FIG. 12, comprises an operational amplifier, indicated at 204, having an exemplary part number of LM339. Resistors R20, R21, R22, R23, R24 and R25 have exemplary resistance values of 510 kΩ, 97.6 kΩ, 20.0 kΩ, 20 kΩ, 1 MΩ and 100 kΩ, respectively.

As shown in FIG. 13, the passive infrared sensor 12 has an exemplary part number P2288. The first amplifier stage 166 comprises an operational amplifier 206 having an exemplary part number of LM358N. Capacitors C1, C2, C3, C4 and C5 have exemplary capacitance values of 100 μF, 0.22 μF, 100 μF, 0.1 μF, 0.47 μF and 47 μF. Resistors R1, R2, R3 and R4 have exemplary resistance values of 33 kΩ, 10 kΩ, 560 kΩ and 47 kΩ, respectively.

As shown in FIG. 13, the second amplifier stage 168 comprises an operational amplifier 208 having an exemplary part number of LM358N. Capacitors C8, C9 and C10 have exemplary capacitance values of 0.1 μF, 0.047 μF and 47 μF, respectively. Resistors R5, R6, R8, R9, R10, R11, R13 and variable resistor R15 have exemplary resistance values of 10 kΩ, 150 kΩ, 100 kΩ, 33 kΩ, 100 kΩ, 22 kΩ, 68 kΩ, 22 kΩ and 500 kΩ, respectively.

As shown in FIG. 13, the comparator 172 of the comparator circuit 170 has an exemplary part number of LM393N. Resistors R12 and R14 have exemplary resistance values of 100 kΩ and 47 kΩ, respectively.

The timer circuit 174 (shown in FIG. 13) comprises a timer 175 having an exemplary part number of MC14538. Diodes D1, D2, D3 and D4 have an exemplary part number of 1N4148. Resistors R16, R17, R18, R19 and R20 have exemplary resistance values of 10 kΩ, 2.74 MΩ, 1.37 MΩ, 226 kΩ, and 10.0 kΩ, respectively. A capacitor C12 has an exemplary capacitance of 22 μF. A transistor Q1 has an exemplary part number of 2N3904.

The sensor adjust circuit 180 (FIG. 13) comprises a variable resistor R22 and a resistor R23 having exemplary resistance values of 100 kΩ and 20 kΩ, respectively, and a capacitor C11 having an exemplary capacitance of 0.1 μF.

The second comparator circuit 182 (FIG. 13) comprises an operational amplifier indicated at 210 having an exemplary part number of LM393N. Resistors R21, R24, R25 and R26 have exemplary resistance values of 51 kΩ, 12 kΩ, 51 kΩ, and 2 MΩ.

The constant voltage regulator 184 (shown in FIG. 13) has a voltage regulator 211 having an exemplary part number of LM2931Z-5.0 connected with capacitors C7, C13, and C14 having exemplary capacitance values of 0.22 μF, 10 μF, and 22 μF, respectively.

The voltage detection circuit 186 (shown in FIG. 13) comprises an operational amplifier 212 having an exemplary part number LM339 having a feedback resistor R16 with an exemplary resistance value of 324 kΩ. Resistors R12, R13, R15, R17 and R18 have exemplary resistance values of 71.5 kΩ, 20.0 kΩ, 10.0 kΩ, 49.9 kΩ, and 49.9 kΩ, respectively.

The reference voltage circuit 188 (shown in FIG. 13) has a voltage regulator 214 having an exemplary part number LM285, and a resistor R19 having an exemplary resistance of 47 kΩ and a capacitor C3 having an exemplary capacitance of 10 μF.

As shown in FIG. 12, the lamp activation circuit 190 has two operational amplifiers 216 and 218 having an exemplary part number of LM339. The ballast capacitors C8 and C9 have exemplary capacitance values of 0.001 μF and 0.1 μF. Resistors R1, R2, R3, R4, R5 and R6 have exemplary resistance values of 51 kΩ, 15 kΩ, 36 kΩ, 82 kΩ, 20 kΩ, and 1 MΩ. Capacitor C1 has an exemplary capacitance value of 0.1 μF. Diodes D12, D13, and D14 have an exemplary part number of 1N4148.

The transformer T1 in the AC generation circuit 192 (shown in FIG. 12) and the inductor L1 (shown in FIG. 12) are made by those skilled in the art to any desired specifications. Transistor Q2 has an exemplary part number of 2N4403, and transistors Q3 and Q4 have an exemplary part number of 2N6486. Resistors R7, R8 and R9 have exemplary resistance values of 10 kΩ, 4.7 kΩ, and 150 kΩ, respectively. Capacitors C4 and C5 have exemplary capacitance values of 220 pF and 3300 pF, respectively.

The lamp cathode heater circuit 194 (shown in FIG. 12) has a transistor Q5 having an exemplary part number of 2N2222, capacitor C6 having an exemplary capacitance value of 1000 μF, a diode D10 having an exemplary part number of 1N4001, and resistors R10 and R11 having exemplary resistance values of 3.6 kΩ and 1 kΩ.

Although the invention has been described in terms of several preferred embodiments thereof, other embodiments that are apparent to those of ordinary skill in the art are also within the scope of the invention. Accordingly, the scope of the invention is intended to be defined only by reference to the appended claims.

What is claimed is:

1. A solar powered light, comprising:
   a lamp having an adjustable configuration and adapted to be mounted to a surface, said lamp having a housing with a battery disposed therein;
   at least one extension arm adjustably attached to said housing; and
   a photovoltaic array generating power upon receiving sunlight and transferring the power to said battery, said photovoltaic array adjustably mounted to one end of said extension arm remote from said lamp, said extension arm rotatably adjustable to position said photovoltaic array to receive direct sunlight.

2. A solar powered light as defined in claim 1, additionally comprising:
   a sensor rotatably mounted to said lamp, said sensor activating said lamp upon sensing infrared radiation.

3. A solar powered light as defined in claim 2, wherein said sensor deactivates said lamp when said infrared radiation is not sensed after a preselected period of time.

4. A solar powered light as defined in claim 1 wherein said comprises a compact fluorescent bulb.

5. A solar powered light as defined in claim 1, wherein said battery is a lead acid battery having a capacity of 6.5 ampere-hours.

6. A solar powered light as defined in claim 1, wherein said battery is a lead acid battery having a capacity of 10 ampere-hours.

7. A solar powered light as defined in claim 1, wherein said battery is a user's battery and said lamp is configured to directly connect to the user's battery.

8. A solar powered light as defined in claim 2, further comprising:
   at least one amplifier stage coupled to said sensor, said amplifier stage amplifying a bipolar signal received from said sensor upon sensing infrared radiation.

9. A solar powered light as defined in claim 8, wherein a variable resistor in said amplifier stage is varied to prevent activating said light.

10. A solar powered light as defined in claim 8, further comprising:
    a timer circuit coupled to said sensor, said timer circuit activating said lamp when said sensor senses infrared radiation.

11. A solar powered light as defined in claim 10, further comprising a sensor adjust circuit coupled to a light sensor for generating a resistance in the presence of light, said sensor adjust circuit adjusting the sensitivity of said light sensor to operate in the presence of an extraneous light source.

12. A solar powered light as defined in claim 11, further comprising:
    a comparator circuit coupled to said light sensor, said comparator circuit resetting said timer circuit when said light sensor detects light.

13. A solar powered light as defined in claim 12, further comprising a voltage detection circuit coupled to said battery, said voltage detection circuit disabling said lamp when a voltage produced by said battery drops below a preselected voltage and enabling said lamp when said voltage rises above a second preselected voltage.

14. A solar powered light as defined in claim 13, further comprising an AC generation circuit coupled to said lamp, said AC generation circuit generating alternating current sufficient to cause said lamp to emit light.

15. A solar powered light as defined in claim 1, further comprising:
    a means for supplying current to a cathode of said lamp for a short period of time to allow said lamp cathode to be heated by a lamp cathode heater circuit coupled to said lamp.

16. A solar powered light, comprising:
    a lamp having an adjustable configuration and adapted to be mounted to a surface, said lamp having a housing with a battery disposed therein;
    at least one extension arm adjustably attached to said housing;
    a photovoltaic array generating power upon receiving sunlight and transferring the power to said battery, said photovoltaic array adjustably mounted to one end of said extension arm remote from said lamp, said extension arm rotatably adjustable to position said photovoltaic array to receive direct sunlight;
    a light source;
    a reflector portion disposed about said light source;
    a lens portion secured to said reflector portion; and
    means for movably mounting said reflector portion to said housing, said reflector portion rotatable in a horizontal and vertical direction to focus light from said light source at a desired location.

17. A solar powered light defined in claim 16, wherein said reflector portion rotates substantially 180° in said horizontal and vertical directions.

18. A solar powered light comprising:
    a lamp having an adjustable configuration and adapted to be mounted to a surface, said lamp having a housing with a battery disposed therein;
    at least one extension arm adjustably attached to said housing;
    a photovoltaic array generating power upon receiving sunlight and transferring the power to said battery, said photovoltaic array adjustably mounted to one end of said extension arm remote from said lamp, said extension arm rotatably adjustable to position said photovoltaic array to receive direct sunlight;
    a joint member disposed on said housing, said extension arm adjustably secured to said housing disposing said joint member in an interlocking arrangement with corresponding members formed in said extension arm; and
    means for retaining said interlocked arrangement, the extension arm being adjusted by removing said retaining means and rotating said extension arm to a new desired position and then inserting said retaining means in place.

19. A solar powered light as defined in claim 1, further comprising:
a mounting flange adapted to mount said housing under the eave of a roof.

20. A solar powered light, comprising:
a lamp having an adjustable configuration and adapted to be mounted to a surface, said lamp having a housing with a battery disposed therein;
at least one extension arm adjustably attached to said housing;
a photovoltaic array generating power upon receiving sunlight and transferring the power to said battery, said photovoltaic array adjustably mounted to one end of said extension arm remote from said lamp, said extension arm rotatably adjustable to position said photovoltaic array to receive direct sunlight;
a mounting flange adapted to mount said housing on a round pole to illuminate surrounding areas, said mounting bracket having a configuration defining a groove defined to accommodate a round pole, said configuration terminating in projecting members having apertures aligned with corresponding apertures in said housing to receive securing means therethrough.

21. A solar powered light as defined in claim 20, wherein said configuration comprises retaining ears adapted to accommodate a square pole therethrough.

22. A solar powered light, comprising:
a photovoltaic array generating power upon receiving sunlight and transferring the power to a battery, said photovoltaic array mounted to receive direct sunlight and maintain said battery in a charged condition;
a lamp providing illumination upon receiving power from the battery, said lamp having cathodes;
an AC generation circuit coupled to said lamp, said AC generation circuit generating alternating current sufficient to cause said lamp to emit light when said alternating current is applied to said cathodes; and
a lamp cathode heater circuit coupled to said lamp comprising a means for supplying current to said lamp cathodes for only a short period of time to allow said lamp cathodes to be heated only prior to illuminating.

23. A solar powered light as defined in claim 22, wherein said supplying means comprises a resistance means for receiving current and providing heat to said lamp cathodes.

24. A solar powered light as defined in claim 22, wherein said supplying means comprises a relay means for supplying current to said lamp cathodes.

25. A solar powered light as defined in claim 22, wherein said lamp cathode heater circuit supplies current to said lamp cathodes only when said lamp cathodes are cold.

26. A solar powered light as defined in claim 22, additionally comprising:
a sensor rotatably mounted to said lamp, said sensor activating said lamp upon sensing infrared radiation.

27. A solar powered light as defined in claim 26, wherein said sensor deactivates said lamp when said infrared radiation is not sensed after a preselected period of time.

28. A solar powered light as defined in claim 22, wherein said light comprises a compact fluorescent bulb.

29. A solar powered light as defined in claim 22, wherein said battery is a lead acid battery having a capacity of 6.5 ampere-hours.

30. A solar powered light as defined in claim 22, wherein said battery is a lead acid battery having a capacity of 10 ampere-hours.

31. A solar powered light as defined in claim 22, wherein said battery is a user's battery and said lamp is configured to directly connect to the user's battery.

32. A solar powered light as defined in claim 26, further comprising:
at least one amplifier stage coupled to said sensor, said amplifier stage sensitizing a bipolar signal received from said sensor upon sensing infrared radiation.

33. A solar powered light as defined in claim 32, wherein a variable resistor in said amplifier stage is varied to prevent activating said light.

34. A solar powered light as defined in claim 33, further comprising:
a timer circuit coupled to said sensor, said timer circuit activating said lamp when said sensor senses infrared radiation.

35. A solar powered light as defined in claim 34, further comprising a light sensor, said light sensor generating a resistance in the presence of light.

36. A solar powered light as defined in claim 35, further comprising a sensor adjust circuit coupled to said light sensor, said sensor adjust circuit adjusting the sensitivity of said light sensor to operate in the presence of an extraneous light source.

37. A solar powered light as defined in claim 36, further comprising:
a comparator circuit coupled to said light sensor, said comparator circuit resetting said timer circuit when said light sensor detects light.

* * * * *